United States Patent [19]

Herregods et al.

[11] Patent Number: 6,064,397

[45] Date of Patent: *May 16, 2000

[54] METHOD FOR CREATING MULTIPLE DOCUMENTS HAVING IDENTICAL BACKGROUND REGIONS AND PAGE SPECIFIC IMAGE REGIONS

[75] Inventors: Marc Herregods, Hever; Dirk Tjantele, Putte, both of Belgium

[73] Assignee: Agfa Gevaert N.V., Mortsel, Belgium

[ * ] Notice: This patent issued on a continued prosecution application filed under 37 CFR 1.53(d), and is subject to the twenty year patent term provisions of 35 U.S.C. 154(a)(2).

[21] Appl. No.: 08/525,054

[22] Filed: Sep. 8, 1995

[30] Foreign Application Priority Data

Sep. 13, 1994 [EP] European Pat. Off. .............. 94202642

[51] Int. Cl.[7] .................................... G06T 11/00
[52] U.S. Cl. ......................... 345/435; 707/507; 707/520
[58] Field of Search .................................... 395/782, 779, 395/784–787, 792, 106, 182.03; 382/305; 345/123, 433, 435; 358/296; 707/506–508, 517, 520

[56] References Cited

U.S. PATENT DOCUMENTS

| | | |
|---|---|---|
| 4,665,555 | 5/1987 | Alker et al. .............................. 382/305 |
| 5,025,396 | 6/1991 | Parks et al. .............................. 707/506 |

*Primary Examiner*—Almis R. Jankus
*Attorney, Agent, or Firm*—Edward L. Kelley

[57] ABSTRACT

In desk top publishing or professional printing, the need exists to print a set of documents which have a generally identical background image and differ from each other by a small area, a page specific image region. A method is described to locate each page specific image region in a background image page layout. A master file stores this background image information along with positional parameters and a file reference to the page specific image region data. The page specific data are stored in one or more data files, generated by a database application program. The master file and page specific file are combined such that the background image is transformed to a bitmap only once, and the page specific data variously modify this bitmap to represent each individual page.

29 Claims, 9 Drawing Sheets

```
IMdict begin
/AD_ImMatrix matrix def AD_ImMatrix currentmatrix pop
tvs^
%ALDImageFileName: Macintosh HD:Data:TIFF Files:TIFF1.VDF
%ALDImageDimensions: 142 142 .
%ALDImageCropRect: 0 0 142 142
%ALDImageCropFixed: 0.00000 0.00000 142.00000 142.00000
%ALDImagePosition: 396.0 650.5 396.0 792.5 538.0 792.5 538.0 650.5
%ALDImageResolution: 72.000 72.000
%ALDImageColorType: Process
%ALDImageColor: 0.000 0.000 0.000 1.000 (Black)
%ALDImageTint: 1.000
%ALDImageOverprint: false
%ALDImageType: 1 8
%ALDImageGrayMap: 0 262 524 786 1049 etc....
%%BeginObject: image
AD_ImMatrix [20.000000 0.000000 0.000000 20.000000 7920.000000 -3600.000000] conca
true 142 142 8 false 0.000 0.000 0.000 0.000 1.000 1.000 (Black) 1.000 true
%%BeginData: 20171 Binary Bytes
isCL^
%%EndData
%%EndObject
end
```

FIG. 3

```
userdict /__AGFA__Copies 1 put

/__AGFA_VDF_DICT 100 dict def

__AGFA_VDF_DICT begin
   /__AGFA_VDF_CTM matrix defaultmatrix def
   /PageSizeRequest {
     initgraphics
     __AGFA_VDF_DICT begin
       __AGFA_VDF_DICT /__AGFA_VDF_BOUND known
       {__AGFA_VDF_BOUND aload pop newpath moveto lineto lineto lineto
         closepath clip) if
       __AGFA_VDF_CTM setmatrix  end
   } def
end /__AGFA__RedefIfKnown {
   currentdict begin
     [0 {== __AGFA_VDF_DICT begin PageSizeRequest end} /exec load]
     2 copy exch 50 string cvs  0 exch put cvx def
   end
} def

[/a3 /a4 /A4 /a4small /a5 /A5 /b5 B5
/Letter /Letter letersmall / note / legal /11x17 /ledger]
{__AGFA__RedefIfKnown} forall statusdict begin
   { /lettertray /11x17tray /ledgertray /legaltray
     /statementtray /executivetray /a3tray /a4tray /b4tray /b5tray]
   {__AGFA__RedefIfKnown) forall
```

FIG. 4A

```
/setpapertray dup currentdict exch known
    {(pop __AGFA_VDF_DICT begin PageSizeRequest end} bind def}
    {userdict exch (pop __AGFA_VDF_DICT begin PageSizeRequest end}
        bind put} ifelse
end /setpagedevice (pop __AGFA_VDF_DICT begin PageSizeRequest end) def __AGFA_VDF_DICT begin /__AGFA_SAVE_CONTEXT {
    __AGFA_VDF_DICT begin dup 3 dict def load end
    /_numdicts countdictstack put
    __AGFA_VDG_DICT begin          /__AGFA_ContextSave save def end
} def /__AGFA_RESTORE_CONTEXT {
    __AGFA_VDF_DICT begin load
    begin
        / numdicts load
        end
    end
    countdictstack exch sub dup 0 gt
        {(end) repeat} if
    __AGFA_VDF_DICT begin __AGFA_ContextSave restore end
} def
end
```

FIG. 4B

```
/_AGFA_SHOWPAGE (userdict begin
    /#copies AGFA Copies def
    systemdict
    /showpage get exec
        AGFA_VDF_DICT begin
        /_AGFA_VDF_CTM Matrix defaultmatrix def
    end}
def /_AGFA_COPYPAGE {userdict begin
    /#copies AGFA Copies def
    systemdict
    /copypage get exec
    end}
def /_AGFA_CLEAR_RECT {
    statusdict begin
        statusdict /setvariabledatabox known
        {8 {pop} repeat}
        {systemdict begin matrix defaultmatrix setmatrix end initclip
            newpath moveto lineto lineto lineto closepath
            currentgray 1 setgray fill setgray}
        ifelse
} def
```

```
/_AGFA_MAKE_TRANS_FROM_RECT {
  systemdict begin matrix defaultmatrix setmatrix end
  8 copy 8 array astore
  _AGFA_VDF_DICT begin / _AGFA_VDF_BOUND exch def end
  8 copy newpath moveto lineto lineto closepath clip
  4{pop}repeat 4 copy
  exch 4 1 roll exch sub 3 1 roll exch sub exch atan 5 1 roll
  pop pop translate rotate
  _AGFA_VDF_DICT begin / _AGFA_VDF_CTM matrix currentmatrix def end
} def /_AGFA_SAVE_VDF_BOX
{statusdict begin statusdict /setvariabledatabox known
  {matrix defaultmatrix setmatrix setvariabledatabox }
  {pop pop pop pop pop (ppppp) ==}
  ifelse end
} def /_AGFA_SHOWPAGE_TO_NOTHING {/showpage {} def } def
_AGFA_SHOWPAGE_TO_NOTHING % PageMaker Prolog section - PageMaker Page section 1

_AGFA_VDF_DICT begin /savecon / _AGFA_SAVE_CONTEXT load end exec

/_AGFA_VDF_RECT_11 {
  396.000 650.500 396.000 792.500 538.000 792.500 538.000 650.500
} def
1 396 650 538 793 _AGFA__SAVE_VDF_BOX
```

FIG. 4E

```
% Start loop over different database records
 _AGFA_VDF_RECT_11 _AGFA_CLEAR_RECT
gsave
 _AGFA_VDF_RECT_11 _AGFA_MAKE_TRANS_FROM_RECT
% FileMaker VDFx.PS Prolog section ; Page section 1 ; Trailer section
grestore
 _AGFA_COPYPAGE
% Second iteration
 _AGFA_VDF_RECT_11 _AGFA_CLEAR_RECT
gsave
 _AGFA_VDF_RECT_11 _AGFA_MAKE_TRANS_FROM_RECT
% FileMaker VDFx.PS Prolog section ; Page section 2 ; Trailer section
grestore
 _AGFA_COPYPAGE
% Third iteration
 _AGFA_VDF_RECT_11 _AGFA_CLEAR_RECT
```

FIG. 4F

```
gsave
    _AGFA_VDF_RECT_11 _AGFA_MAKE_TRANS_FROM_RECT
% FileMaker VDFx.PS Prolog section ; Page section 3 ; Trailer section
grestore
_AGFA_COPYPAGE
% Last iteration
    _AGFA_VDF_RECT_11 _AGFA_CLEAR_RECT
gsave
    _AGFA_VDF_RECT_11 _AGFA_MAKE_TRANS_FROM_RECT
% FileMaker VDFx.PS Prolog section ; Last Page section ; Trailer section
grestore
_AGFA_SHOWPAGE
_AGFA_VDF_DICT begin /savecon /__AGFA_RESTORE_CONTEXT load end exec
% Trailer section of PageMaker output MASTER PS
```

METHOD FOR CREATING MULTIPLE DOCUMENTS HAVING IDENTICAL BACKGROUND REGIONS AND PAGE SPECIFIC IMAGE REGIONS

FIELD OF THE INVENTION

The present invention relates to a method for creating multiple documents having identical background image regions and document specific image regions containing individual data elements. The method can be used in desk top publishing systems and for professional printed matter e.g. for direct mailing or personalised copies.

BACKGROUND OF THE INVENTION

For direct mailing purposes or in the production of personalised printed matter, it is necessary to print between ten or one thousand documents, having the same contents, except for a specific small area of the document. Usually, a document consists of one single sided sheet of paper, but such a document can also consist of several single sided or even double sided sheets. It is also possible that several pages of such a document must be printed or imposed on a single sheet of paper. One or more imposed sheets are then folded and/or assembled in a specific order to deliver a folder or booklet with the required layout. We will discuss here the problems that arise when individualised single sided sheets must be provided, although the current invention also solves these problems for the more complex configurations.

The most simple format of an individualised single sided sheet comprises a general text with open spaces. In the open spaces, the specific data are filled in per page. Traditionally, this is handled in the following way: the general text—indicated further on as the background image—is printed on a plurality of sheets, which are all identical. The batch printing can be done by an offset printer, by a photocopier or by a digital printer. The page specific information can be added immediately after the first printing pass or on a later moment. This can be per page by an individual tag stuck on the sheet, by hand writing, type-writing or by a printer coupled to a computer. Such a printer can be an impact printer, electrographic laser printer, inkjet printer etc. The problems for this method are the visible difference in writing and between the ink of the background image and the ink of the page specific data. Moreover, the page specific text is usually not properly aligned with the background text. The second pass to add the page specific data requires extra time and printing devices. If the background quality must be high, offset printing is required, which is very costly for small batches of individual copies. Another important drawback of this method is that only overwriting is possible. Nothing from the background image can be locally erased.

In the current digital output systems comprising a bitmap printer, for example in desktop applications, it is possible to generate a data stream for individual pages in a page description language. For each page to be printed, the data stream comprises a description of the background image and a description of the individual image. For each individual page, the data stream describing the background image and the specific data must be converted to a bitmap. If the background image is complex, this means an important burden for the raster image processor (RIP) generating the bitmap, while just a small portion on the sheet will be different from the previous sheet. Moreover, the transmission per sheet of the data stream describing the background data, can impose a large performance reduction on the total system. If the transmission goes over a network, this kind of print job imposes a tremendous load on the connection, thereby influencing the throughput of other tasks using the same network.

A method that alleviates the transmission problem is the creation of "forms". A page description language that supports the definition and use of forms is a Level 2 feature of the POSTSCRIPT. page description language. POSTSCRIPT is a trade mark of Adobe Systems Inc. The POSTSCRIPT language reference manual, 2nd edition ISBN 0-201-18127-4, chapter 4.7 on pages 172 to 175 describes the concept and the use of forms. A fixed template can be defined in a form, and the variable information can be painted on top of it. Each execution of the form will produce the same output. The graphical output of the form is saved in a cache. Each time the form is used, the saved output may be retrieved instead of re-executing the form's definition. The manual states that this can significantly improve performance when the form is used many times. The way of caching is implementation dependent. In most implementations, the cache stores an internal representation—a display list—that is converted to a bitmap each time the form is required. Anyhow, if a form contains an image, the whole image must be cached, which requires a substantial amount of memory. Moreover, the generation of a bitmap from the display list still requires as serious amount of work.

None of the above described methods give a satisfactory solution to the problems sketched herein before.

OBJECTS OF THE INVENTION

It is therefore a first object of the invention to provide a method that generates high quality pages having an identical background image and a specific image on each page.

It is a further object of the invention that each page is generated in a single print pass.

It is a specific object of the invention that the computational effort to generate pages following the first page is substantially reduced with respect to the work required to generate the page specific image region.

Other objects will become apparent from the description hereinafter.

SUMMARY OF THE INVENTION

In accordance with the present invention, a method is disclosed for printing a plurality of pages, having an identical background image region and at least one page specific image region, comprising the following steps:

a) generating a bitmap representation for said background image region and storing said bitmap in a bitmap memory means b) saving in a cache memory means portions of said bitmap representation corresponding to each page specific image region;

c) generating a bitmap representation for at least one page specific image region and storing said page specific bitmap in said bitmap memory means;

d) outputting the contents of said bitmap memory means to a marking engine for printing at least one page;

e) restoring at least one said saved portion from said cache memory means to said bitmap memory means;

f) repeating steps c) to e) until said plurality of pages is printed.

The feature that the background region is directly converted to a bitmap representation of the background image, and not stored in some internal format in a separate cache memory for later retrieval as in the implementation of the POSTSCRIPT "form" command has several advantages:

if the internal format is not a bitmap format, the execution of the "execform" command requires the generation of the bitmap;

if the internal format is a bitmap format, a large amount of cache memory is required for storing the form, apart from the memory required for the bitmap; moreover the "form"—functionality requires that an extra non-bitmap copy is retained to allow scaling, rotation and other graphical state settings;

even if the form is stored in bitmap format, the contents of the separate cache memory must be transmitted to the bitmap memory each time the "execform" command is executed. In a 400 dpi A 3-size colour printer, this can require a data copying of 120 MByte, which requires 3 seconds in a system having a bus bandwidth of 40 MByte per second.

According to the method of the current invention, the bitmap portions—corresponding to the page specific image regions—of the bitmap memory means that must be saved, are usually substantially smaller than the whole bitmap. This has the advantage that just a small amount of memory is required to save the bitmap portions. Moreover, the saving operation and later on the restoring operations do not put a big data transmission burden on the raster image processor.

The steps c), d) and e) that must be executed for each individual page are mainly restricted to the bitmap generation for the page specific data. The bitmap data for the page specific image regions can directly be written into the bitmap memory, as if one single page must be printed. As such, no specific processing for this bitmap region or extra processing time is necessary, enabling the system to make use of the high performance processing of usual bitmap generation. The outputting of the bitmap to the marking engine—step d)—must be done in any case. A third essential step e) is the restoration of the bitmap data representing the background image. This must be accomplished at least for the bitmap portion that will be different on the next page. The advantage of this restoration is that e.g. text can always be overlaid on the true background, such that this remains visible where no text is painted. On the other hand, a box containing the text can also be put over the background, whatever is required by the layout. Even the size of this box could vary between consecutive sheets. Such bitmap portions are usually substantially smaller than the background bitmap, such that the transmission requires a small amount of work, which can be done rapidly. Moreover, the restoration of the background bitmap is accomplished by a simple copy operation, involving no other computational effort. A copy operation can be dramatically optimized, based on hardware capabilities or sometimes by specific software implementations in machine language or microcode. To optimise this transmission, preferentially each bitmap portion consists of a rectangular area with horizontal and vertical sides, which fully overlaps one or more page specific image regions. A page specific image region can be a rectangle rotated over e.g. 30 degrees. In that case, the bitmap portion is preferentially the smallest horizontally oriented rectangle, enclosing the rotated rectangle. The page specific image region may also be delineated by a polygon or any other closed path. The bitmap portion is also in that case preferentially the smallest enveloping horizontal rectangle.

The sheets that must be printed are usually sheets of paper. The sheets can be printed single sided or double sided. By a plurality is meant that at least two sheets are printed, having the same background image. Usually a sequence of say hundred of sheets is printed, having the same background image. It is also possible that each individualised sheet must be printed twice or more times, when two or more identical copies are required for each specific page. It is also possible that the same "background image" appears e.g. four times on one sheet, and that on that sheet four individual pages are prepared. The four "background images" form in that case one large "background image" in the teaching of this invention and the sheet then contains four, eight, . . . sheet specific image regions. A background data stream describing such type of pages is usually obtained by "step and repeat" imposition, in the case that each required sheet fits two or more times on one printed sheet.

It is also possible that each individual document consists of two or more sheets. In that case, preferentially the first pages of each individual document are generated and output to the printer first, followed by the second pages of each individual document. The documents can then be sorted and assembled in a further pass.

The identical background image region is that part of the sheet that carries an image that appears on each sheet. The background image can be just printed text, or graphics or the reproduction of a contone image, or any combination of these "graphical objects". The graphical objects can be in black and white or in colour. A contone colour or black and white image can be reproduced on each sheet by binary halftoning, by multilevel halftoning or by a contone reproduction process. Depending on the binary, multilevel or contone process, the bitmap requires per pixel one or more information bits (binary digits) per colour in the bitmap memory means.

A specific image region can contain personal identification data such as a person's name, address, etc., a digital representation of a person's photograph, a numeric representation or a barcode for a person's registration number, etc. The specific image region can also describe a specific item, such as a specific house in a real estate database, or specific object in a collection. The page specific image region can lie completely within the background image region, partly overlap it or be completely disjunctive from it. It is also possible that more than one page specific image region is present on each sheet. It is possible for example that a person's name appears on two different locations of the sheet, or that his name appears at one page specific image region and his picture appears on another page specific image region. If more than one page specific image region is present, it is possible that these regions partly or entirely overlap.

Generating a bitmap representation is the process to convert one or more data streams describing the image(s) to be printed on the sheet, in a format that complies with the spatial and density resolution of a raster output device that will print the sheet. A raster output device virtually divides the sheet in connected rectangular cells, called output pixels or recorder elements, and has the capability to address each recorder element individually to assign a specific density level to it. Per recorder element, or per group of recorder elements, the bitmap needs one memory cell, to keep a representation for the density to be assigned to the corresponding recorder element(s). In binary raster output devices, two density levels can be assigned to or rendered on each recorder element. For this type of devices, the bitmap is usually contained in a large memory array or matrix having one bit—capable to store a one or a zero—for each individual recorder element. For raster output devices, having a higher density resolution than just two levels, more than one bit per recorder element may be necessary for each recorder element. The memory means, in which the bitmap representation for the image to be printed on the sheet is stored, is called the bitmap memory means. This bitmap memory means can be realised by a random access memory (RAM) or for example a magnetic disk. Once a sheet must be printed, the contents of this memory means is sent to the printer engine, that converts the electrical signals representing the bitmap to a visible image on the sheet.

A specific feature of the current invention is that one or more portions of said bitmap representation are extracted from the bitmap memory means, once the bitmap representation for the background image region has been generated. Each portion preferentially corresponds to one page specific image region. The portion that is extracted preferentially coincides with the page specific image region or, as described above, is an enveloping rectangle comprising said page specific image region. If the output device has a binary density rendering capability only, the bitmap memory stores one bit per recorder element. If the boundary of the page specific image does not coincide with a byte boundary (eight bits are usually grouped in one byte), it is advantageous to save the whole byte comprising the boundary bit, or even to save a bigger memory unit such as a word of sixteen or thirty two bits. Each bitmap portion is stored in a cache memory means. This is a memory means that has no overlap with the bitmap memory means, but can be located on the same physical medium. The cache memory means may be random access memory (RAM), but it can also be located on a magnetic disk device. If the bitmap portions are relatively small and fast access is required, they can be stored in RAM. If these portions can be large, then they are preferentially stored on a less expensive medium such as a disk.

In the same way as the background image is converted to a bitmap representation and stored in the bitmap memory means, the page specific data are converted to a bitmap representation and stored in said bitmap memory means. If two page specific image regions are present on each sheet, it is possible that one such region remains unchanged over two or more consecutive pages, while another region changes from page to page. This is e.g. the case when each person acquires two or more differently numbered personalised tickets. In that case two options are open. In the first way of working, each time the bitmap for both image regions (name, number) is generated and stored in the bitmap memory means. In the other option, only the bitmap for the varying region (number) is generated and stored in the bitmap memory means, while the other region (name) is left unchanged, for it contains the right image printed on the previous sheet, and not erased by the previous restoring step.

Once the background image and page specific data are in bitmap representation in the bitmap memory means, the contents of said memory means can be transmitted to a marking engine for converting the bitmap representation to a density distribution on the sheet. Usually one sheet must be printed for each specific document. It is possible however, that each document must be available in two or more copies. It that case, the contents of the modified bitmap memory means can be output as many times to the marking engine as copies are required.

Once the modified bitmap memory contents is printed as required, the bitmap memory can be prepared for the next sheet to be printed. If just one page specific image region is present, the bitmap portion saved in the cache memory means is retrieved and restored in its original location in the bitmap memory means. At that moment, the bitmap memory means contains the background image representation as it was generated in the first stage. If two or more image specific regions (cfr. name, number) are present on each sheet, and dependent on which of the above two options is selected (i.e. restore each region or just the one that will change), one or more bitmap portions are retrieved from the cache memory means and restored in the bitmap memory means. If the second option is selected, sometimes the bitmap memory means does not contain the original background image representation.

The above steps of generating the page specific bitmap, printing the sheet and restoring the bitmap portion are repeated over and over until all pages are printed. The restoration of the bitmap before the first sheet print or after the last sheet print is optional, and can be effectuated or not, based on organisational considerations.

DETAILED DESCRIPTION OF THE INVENTION

The invention is described hereinafter by way of an example with reference to the accompanying figures wherein:

FIG. 3 shows a set of OPI-comments, describing the inclusion of image data; and

FIG. 4.A, 4.B, 4.C, 4D, 4E and 4F show excerpts of a POSTSCRIPT data stream for carrying out the invention.

Figure 1:
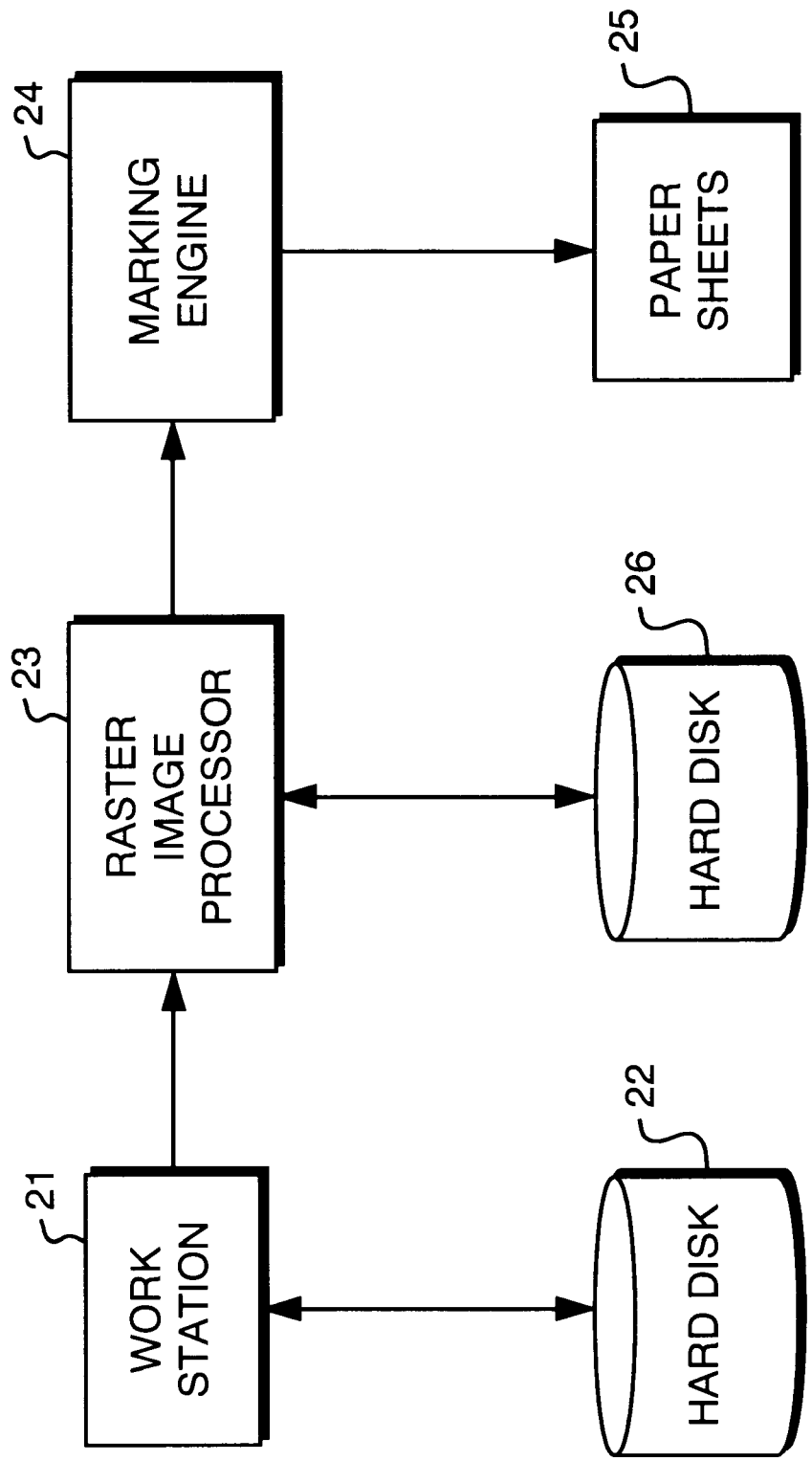
FIG. 1 shows a specific embodiment for carrying out the method according to the current invention.

FIG. 1 shows a configuration on which the method of the current invention can be carried out. The system can be used for example in a desktop publishing environment and comprises a workstation 21 for creating a page layout, and for generating the page specific data elements. The system usually comprises a magnetic hard disk 22, for permanently storing elements for composing the background image, like digitally scanned images, graphics such as logo's and font descriptions, as well as databases containing individual records for the page specific image regions and executable programs for performing operations on the data. The workstation can also be coupled directly to an image scanner for image acquisition, or images can be transmitted to it via a network, magnetic or optical carriers etc. The workstation is further coupled to a raster image processor (RIP) 23 in a point to point or network connection, or off line via magnetic or optical carriers. As will be described below, the workstation generates a data stream describing the background image and the page specific image data, usually in a page description language such as POSTSCRIPT. This data stream is accepted by the raster image processor 23, that converts it to a bitmap representation. This bitmap representation is stored in a bitmap memory means, which is usually a random access memory (not shown) within the raster image processor 23. The bitmap portions are saved on a cache memory means, which may be a hard disk 26.

The electrical signals corresponding to the bitmap representation are sent from the raster image processor 23 to the marking engine 24, which renders the representation on a physical medium, like a stack of printed sheets 25.

The workstation 21 can be a Mac Quadra 800, configured with AppleTalk or EtherTalk. Preferentially the operating system running on it is Macintosh System 7, supporting LaserWriter printer driver version 7 and Ethertalk phase 2.

To carry out the method of the current invention, preferentially the following application programs run on the workstation 21:

a digital image creation program a page layout program for creating a data stream MASTER.PS a database application program for creating data streams VDFx.PS a variable data field (VDF) merger for combining the MASTER.PS and VDFx.PS data streams.

A suitable digital image creation program is PHOTOSHOP version 2.5.1, which is a trade mark of Adobe Systems Inc.

The page layout program may be QUARKXPRESS version 3.3, which is a trade mark of Quark Inc.; or PAGEMAKER version 4.2 or 5.0, which is a registered trademark of Aldus Corporation. This is a professional page layout program integrating colour, image data, graphics and text and generating an Encapsulated POSTSCRIPT or EPS-file. It generates one or more page sections, each page section describing a background image, along with the positional parameters of each page specific image region.

The database application program generates for each page specific image region x, from data in a database format, a POSTSCRIPT compatible output data stream VDFx.PS, which can be directed to a POSTSCRIPT compatible printer for immediate output or to a file. Each VDFx.PS data stream is used as a plug-in in the MASTER.PS data stream by the variable data merger. A suitable database application program is FILEMAKER PRO version 2.0, a trade mark of Claris Inc.

The raster image processor (RIP) 23 can be an Agfa CR-A system, CR-A is a trade name of Agfa-Gevaert N.V. in Mortsel Belgium. The CR-A RIP supports POSTSCRIPT level 1 and an extra feature to enable the method of the current invention. The system comprises two Motorola MC68040 processors, operating at a clock rate of 33 MHz, it further contains an Agfa specific CVI interface board to drive the marking engine 23. The system further comprises a SCSI interface board towards a 340 MByte SCSI compatible hard disk 26, and an ethernet connection 27 to hook the raster image processor 23 up to the same network as to which the workstation 21 is connected to. The CR-A RIP further comprises a random access memory board (not shown), capable to store 128 MByte, with an access time of 80 nanoseconds.

The marking engine 24 is preferably an XC305 or XC315 Agfa Colour Copier, both trade names of Agfa-Gevaert N.V. in Mortsel, Belgium.

Figure 2:
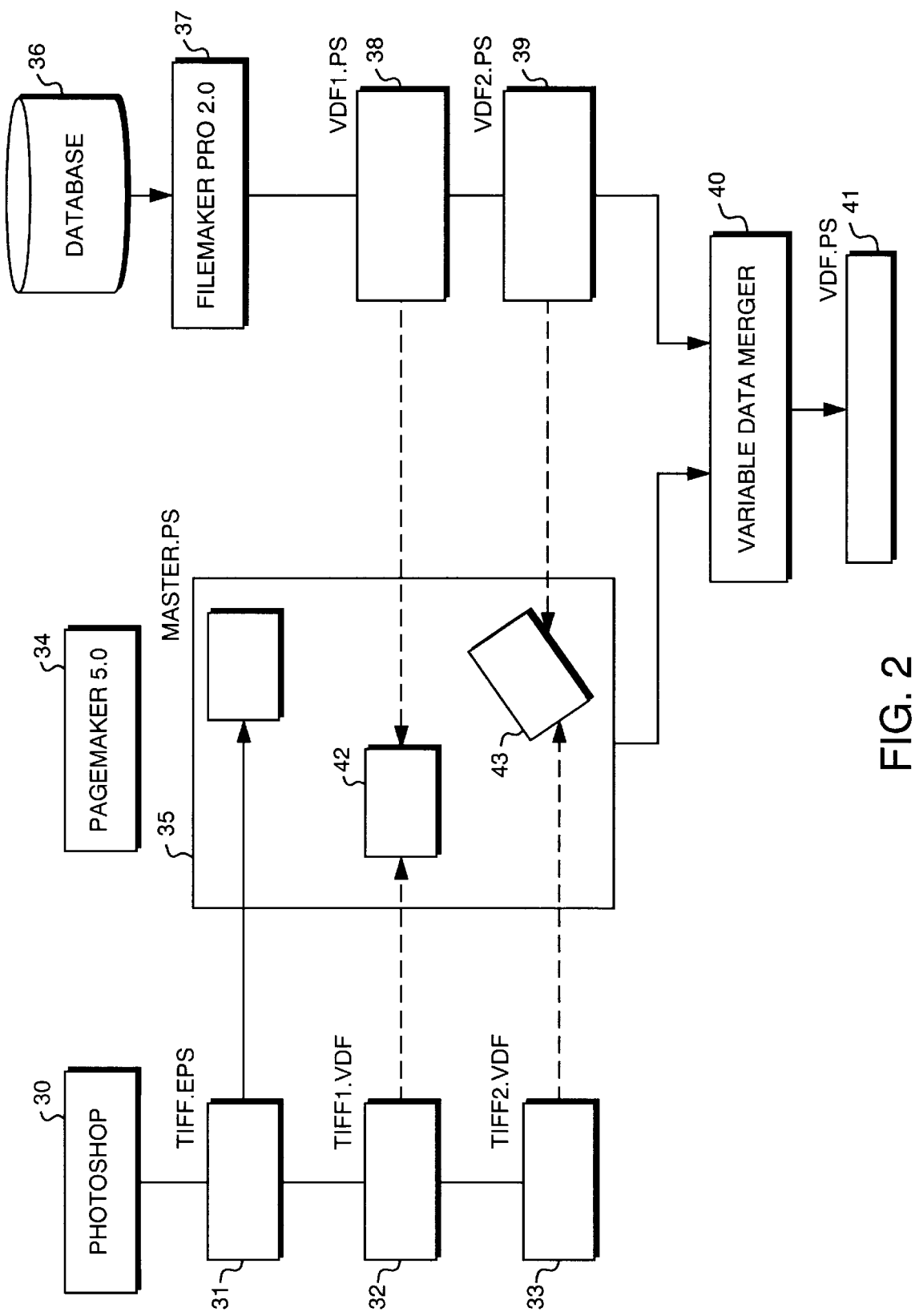
FIG. 2 shows the logical relation between various application programs that can be used to carry out the invention.

^A way for carrying out the invention is now described in conjunction with FIG. 2. If the background image comprises digital images, obtained for example from contone colour images on photo prints, the digital image source files can for instance be generated by the above mentioned PHOTOSHOP application program 30, and saved according to the TIFF (Tag Image File Format, trade mark of Aldus Inc.) specification on hard disk in a file called TIFF.EPS 31. For each page specific image region preferentially a separate dummy TIFF file, with the extension .VDF is created by PHOTOSHOP. The dummy file 30 for the first page specific image region 42 can be called TIFF1.VDF, for the second page specific image region 43 TIFF2.VDF 33 etc. The contents of these TIFFx.VDF image files don't really matter, because their contents will not appear in the final VDF.PS combined data stream 41. Preferentially they represent low resolution images, such that they do not add too much data to the MASTER.PS file. Alternatively, images comprising templates for the real page specific regions can be created, to allow proper alignment with the background image, as will be discussed below.

In a next step, a page layout program 34 such as QUARKXPRESS or PAGEMAKER.5.0 is invoked. Usually, first a text to be printed on the sheet is imported and shown on the screen of the workstation according to the selected options such as character font, size and other characteristics. All background composition images are then "imported" via the page layout program. This means that a low resolution version of the background composition image as required is shown on the video monitor of the workstation 21, but the whole image is not actually accessed. Each background composition image can be positioned relative to the text within the page layout, mainly with respect to translation, rotation and scaling. If required, more text can be added to annotate the images, text can be reorganised etc. Also the TIFFx.VDF (32, 33) images, representing the page specific image regions, must be properly positioned within the page layout. If each TIFFx.VDF image is just a dummy image, the rectangular area of that image can be properly positioned with respect to the rest of the layout by translation, resizing each side of the rectangle and rotation, over any angle. Preferentially, each TIFFx.VDF file contains an image representation of one page specific image region. If the first page specific image region would contain a person's name, then TIFF1.VDF preferentially represents an image of an arbitrary name, in the font and size as required in the final printed sheet. As such, the rectangular box enclosing that name and occupied by the TIFF1.VDF image can be properly positioned and aligned with the surrounding text in the background image. This rectangular box must not be resized in any dimension, because this would obscure the relation between the template on the video monitor of the workstation and the final result. Another way to properly align the page specific image region within the background image is to incorporate part or the whole test line, where the page specific data are located, in the region. The region is positioned as correctly as possible in a first pass, and after printing one document, and measuring the dislocation, re-positioning the region.

The page layout program will generate an output data stream 35 in a selected page description language. Preferentially, the POSTSCRIPT.Level 1 output format is selected. The output data stream is preferentially directed to a file on hard disk, which we will call the master file MASTER.PS. This master file gives a full description of the background image. The image data, both representing the background composition images and the dummy templates for the page specific image data, may be effectively included in the master file, preferentially in a low resolution format, but are also referenced by it through the file name. The way how an image is referenced to in a POSTSCRIPT file, is defined by the OPI (Open Prepress Interface, trade mark of Aldus Inc.) standard, as described in the Open Prepress Interface Specification 1.2. In FIG. 3, we show an excerpt from a POSTSCRIPT output of PAGEMAKER 5.0. The comments—having a leading % character—define according to the OPI standard the image filename as TIFF1.VDF in the "%ALDImageFileName: "—field and further indicate that the image data are in TIFF format. The dimensions of the image are indicated as 142 pixels by 142 lines, and the rectangular area that the image will occupy in the layout is given as measured in points (1"/72) under the comment "%ALDImagePosition: ". This means that the size of the image and its location within the layout is given. The image data is inserted just after the "%%BeginData" comment line. The "isCL^" command will consume these data such that they are directed to the correct positions within the bitmap. The rectangular area delineated by the four corner points given in the "%ALDImagePosition" comment defines the positional parameters for the page specific image region, such as location, shape, size and orientation of the region. All page specific data must fit within this area. As will be described below, everything page specific outside this area will be clipped.

Once the layout for the background image, along with the positional parameters for the page specific image regions, is fixed, the information contents for each individual page specific image region on each sheet must be generated. As shown in FIG. 2, this is preferentially done by a database application program 37 such as FILEMAKER PRO version 2.0. In this program, a set of records can be imported by manual entry or by accessing data on a database file 36. Each record contains individual fields. A record contains for example the information about a client. A first field in the record gives his last name, the next field his first name, the next field his address etc. The application program 37 allows to pick some fields and format the data in a specific layout. According to the above example, one could define a layout containing two lines: the first line represents the contents of the last name field followed by the first name field and the second line represents the contents of the address field. The application program 37 can now generate a first ASCII POSTSCRIPT Level 1 compatible page specific data file 38—which we will call VDF1.PS—that contains the thus formatted representation of all or a selection of some records from the database, without cover page inclusion. If that file VDF1.PS would be sent to a POSTSCRIPT printer, one page for each record would be generated, each page containing two lines, formatted as described above. The text lines, graphical data or image in VDF1.PS must be positioned relative to a known reference, e.g. the lower left corner of each page, which is the origin position for the POSTSCRIPT interpreter. This lower left corner will then be positioned upon the lower left corner of the rectangular page specific image region within the background image.

The VDF1.PS could reflect the address section of a letter, while further down the letter just the last name must be inserted in the background image. For that purpose, a second page specific POSTSCRIPT data file VDF2.PS 39 can be generated, extracting from the database the same records as VDF1.PS, but formatting just one line containing each time the last name field of the record. Printing VDF2.PS would generate the same amount of pages as with printing VDF1.PS, but on each page just the last name would appear.

For every dummy file TIFFx.VDF (32, 33), a corresponding page specific data file VDFX.PS (38, 39) must be generated. Usually the number of TIFFx.VDF files is the same as the number of VDFx.PS files. It is possible however that the contents of one VDFx.PS file can be used for two different page specific image regions. If for these regions a different dummy file TIFFx.VDF and TIFFy.VDF were generated, it may be appropriate to generate just one VDFx.PS. In this case it could have been also appropriate to reference in the MASTER.PS POSTSCRIPT file two times to the TIFFx.VDF file.

Usually all page specific image files VDFx.PS, VDFy.PS, . . . represent the same amount of pages. As such, the first sheet of the final printed output would contain data corresponding to the first page section described in VDFx.PS and the first page section described in VDFy.PS. The same applies for the second and all subsequent pages. It is possible however to generate a VDFx.PS file describing N+N pages, and a VDFy.PS file describing just two pages. The first printed sheet would then contain the contents of VDFx.PS page section 1 and VDFy.PS page section 1; the second page would contain the contents of VDFx.PS page section 2 and VDFy.PS page section 2; the third page would contain the contents of VDFx.PS page section 3 and VDFy.PS page section 1 again, because VDFy.PS was exhausted and is cyclically repeated; the fourth page would contain the contents of VDFx.PS page section 4 and VDFy.PS page section 2, etc.

Once both the master file MASTER.PS 35 and the page specific image files VDFx.PS 38, 39 are created, these files can be combined to yield the desired result. Therefore a variable data field application program or variable data merger 40 is invoked, offering the following options.

The number of copies for each individual sheet can be selected. If every document needs two or more identical copies, this is set by this number of copies. The paper size on which the background layout must be printed can also freely be selected. All images referenced to in the OPI compatible commands must be retrieved and explicitly included. These dummy images, referenced by a file extension .VDF must not be included as such but must be handled as described below. The variable data merger will generate an ASCII POSTSCRIPT Level 1 compatible combined data stream 41. This data stream can be directed to a file, e.g. on hard disk or directly to a printer system, that accepts a POSTSCRIPT page description language and prints the images represented by the language. If the data stream is directed to a file, this file can be stored temporarily on a storage medium and be sent at a later time to a POSTSCRIPT compatible printing system.

The variable data merger 40 will analyze the MASTER.PS file 35 and locate all the occurrences of a reference to a file with extension .VDF. According to the above example, the program will find TIFF1.VDF, TIFF2.VDF. The program will prompt the operator for the substitution of the TIFF1.VDF reference. According to the above example, the operator would introduce the filename VDF1.PS. The program then prompts for the substitution of TIFF2.VDF; the operator will introduce VDF2.PS, etc.

According to the POSTSCRIPT code in FIG. 4, we will describe now how the variable data merger 40 processes the different input files: one MASTER.PS file 35, several VDFX.PS files 38, 39 and possibly different TIFF-files 31 representing images that must be included in the background image. Therefore we need to recall how a POSTSCRIPT file is structured according to the DSC recommendations.

According to DSC, as defined in the Document Structuring Conventions in the above mentioned POSTSCRIPT language reference manual on pages 611 to 708, a POSTSCRIPT file contains three main sections:

a prolog script a page section; and a document trailer

The prolog script further comprises a header section;

a procedure section; and a document setup.

The procedure section gives the definition of procedures in terms of regular basic POSTSCRIPT expressions, which will mainly be used in the document setup and page sections. The document setup performs initialisations which are valid for all subsequent pages of the document. The page section contains for each subsequent page the commands which are necessary to paint the bitmap representing the page completely and to issue the bitmap contents to the marking engine. Each page within the page section starts—according to the DSC conventions—with a "%%Page L N" comment, wherein L represents a label and N represents the page number in arabic numerals. The trailer section starts with the comment line "%%Trailer" according to the DSC conventions.

The variable data merger application program creates its output data stream in the following way. A specific header section is created. Then the MASTER.PS file is read, and the .VDF file references and templates are replaced by the output generated by the database application program. The general structure of the data stream created by the variable data merger can be summarized as follows:

- Definition of variable data merger specific procedures
- Prolog section of MASTER.PS file (PAGEMAKER output)
- Page section of MASTER.PS file–Page 1 only (PAGEMAKER output) omission of "%%BeginObject. . . %%EndObject" if .VDF image
- Save all bitmap portions according to page specific regions
- For each page in VDFx.PS:
  + Translate and rotate co-ordinate system to lower left corner of page specific region
  + Prolog section of VDFx.PS file (FILEMAKER PRO output)
  + Page section of current page in VDFx.PS file
  + Trailer section of VDFx.PS file (FILEMAKER PRO output)
  + Issue modified "copypage" command also restoring all saved bitmap portions ("showpage" on last page also removing all saved bitmap portions from cache memory)
- Trailer section of MASTER.PS file (PAGEMAKER output)

We will discuss each above section more in detail. The definition of variable data merger specific procedures is in fact an application specific procedure section. In FIG. 4.A a "PageSizeRequest" procedure is defined that must be executed whenever a page size initialisation or the like is done. If this is done during the processing of a VDFx.PS file, then the standard POSTSCRIPT "initgraphics" procedure is invoked and the page specific image region is defined as clip region, such that nothing can be painted outside this region. Next all types of page, paper tray and page device requests (e.g. /a3, etc.) are intercepted and converted to the execution of the above PageSizeRequest command. A context save and restore procedure are defined, that cope with database application programs that leave dictionaries on the stack.

In FIG. 4.B the standard "showpage" and "copypage" commands are redefined such that the required number of copies for each page are printed. As will be discussed below, the "/showpage" and "/copypage" procedures have a specific side-effect, to carry out the invention. Further the AGFA__MAKE__TRANS__FROM__RECT computes translation and rotation parameters from a set of rectangle coordinates obtained from the OPI comments in the master file and stores these corner points for use in the PageSizeRequest. The AGFA__CLEAR__RECT command clears the current page specific image region if the raster image processor does not support the "setvariabledatabox"-procedure, which will be discussed below. If the RIP does support this command, basically nothing special is done. In the AGFA__SAVE__VDF__BOX, we see the use of an AGFASCRIPT (trade mark of Agfa-Gevaert A.G. in Leverkusen, Germany) specific command. AGFASCRIPT is a POSTSCRIPT language interpreter. The setvariabledatabox command consumes five parameters from the stack:

1) bitmap__portion__id: unique identifier to refer to one specific bitmap portion;
2) bitmap__portion__left: most left position of bitmap portion
3) bitmap__portion__bottom: bottommost position of bitmap portion
4) bitmap__portion__right: most right position of bitmap portion
5) bitmap__portion__top: topmost position of bitmap portion Execution of this command will transmit a horizontal rectangular portion of the bitmap from the bitmap memory means to the cache memory means. As will be described below, "copypage" restores all bitmap portions saved by this command, and "showpage" removes all these bitmap portions from cache memory.

Finally, the usual "showpage"-command is redefined such that it has no effect when invoked by the page layout or database programs.

The prolog section of the MASTER.PS PAGEMAKER output file starts at the beginning of the MASTER.PS file and proceeds up to (but not including) the first DSC "%%Page"-comment.

The page section starts at said "%%Page"-comment and proceeds up to (but not including) the next DSC "%%Page"-comment or the DSC "%%Trailer"-comment. The contents of this page section is scanned and output until an OPI-comment line referencing to a .VDF file is found. In that case, the next section enclosed by "%%BeginObject: image" and "EndObject", as shown in FIG. 3, is removed from the output data stream. The rest of this page section is further transmitted to the output data stream. Wherever a non-.VDF-file must be included for background images, it is added to the output data stream. Once this page section from the master-file created by PAGEMAKER is fully transmitted to the output data stream, the background image is fully painted in the bitmap memory means and the image specific regions must now be filled in, in a loop over all data records. Before this procedure is started, the full status is saved by the execution of the "__AGFA__SAVE__CONTEXT"-procedure. A shorthand for the rectangle coordinates for each image specific region is defined (e.g. __AGFA__VDF__RECT__11 definition). Eight numbers defining the position of the four corner points of a rotated rectangle are required. These numbers are retrieved from the OPI-comments, as described above, and define the positional parameters of the page specific image region.

Every portion from the bitmap memory means corresponding to a page specific image region is saved in a cache memory by a function that invokes the AGFASCRIPT specific "setvariabledatabox"-command: e.g. 1 396 650 538 793 __AGFA__SAVE__VDF__BOX. As described above, such a portion is a horizontal rectangular area, completely covering the page specific image region. The co-ordinates of the lower left and upper right corner of this portion are sufficient to fully describe it. If the current sheet contains more than one page specific image region, a plurality of such commands, to save a bitmap portion in cache memory, will be issued, preferentially one per region.

Then the loop for each page in the VDFX.PS file created by FileMaker Pro can be started. The first thing to happen is clearing the page specific image region for RIP's that do not support "usetvariabledatabox". This is done by the commands __AGFA__VDF__RECT__11 and __AGFA__CLEAR__RECT. The last command clears the area if said command is not known. Next the graphical state is saved in a standard POSTSCRIPT "gsave" command. Then the origin is translated to the lower left corner of the rectangular page specific image region and the correct rotation of this rectangle is performed, by the __AGFA__VDF__RECT__11 and __AGFA__MAKE__TRANS__FROM__RECT commands. By the last command also the data falling beyond the rectangular page specific image region provided for the region are clipped. This has the advantage that the background image will not be disturbed outside the region.

Next the prolog section of the VDFx.PS file is transmitted to the output data stream. The prolog section starts from the beginning of the file VDFx.PS file and proceeds up to (but not including) the first DSC "%%Page"-comment. After this section, the appropriate page section for the current page must be added. This section is found by scanning the VDFX.PS file until a "%%Page L N"-comment with the right page number N is found. Everything from this location in the VDFx.PS file up to (but not including) the next DSC "%%Page"-comment or the DSC "%%Trailer"-comment within the VDFX.PS file is included in the output data stream. This data stream will paint the page specific image region with the appropriate graphical data in the bitmap memory means. After this operation, the bitmap is ready to be printed. The single page section is then followed by the trailer section from the VDFx.PS file created by FILE-MAKER PRO. This trailer section starts with the DSC "%%Trailer"-comment and stops at then last character in the VDFx.PS file.

Then the graphical status, valid before the above mentioned "gsave"-command, is restored by a standard POSTSCRIPT "grestore" command. The previous translation and rotation are thus restored. The bitmap memory means is now printed by the _AGFA_COPYPAGE command. This will issue the contents of the bitmap memory means towards the marking engine, that converts the bitmap representation to an optically visible image on a sheet. The contents of the bitmap memory is not lost by this operation. This modified "copypage" command will issue that amount of identical copies which is required by the variable data merger operator. The modified "copypage" command has another AGFA-SCRIPT specific side-effect. Once all required copies are printed, all rectangular portions—saved in cache memory means by the "setvariabledatabox"-command—are restored in the bitmap memory means. As such, the background image is completely restored in the bitmap memory means.

If more pages are present in the VDFx.PS file, the procedure starts again: clear the page specific image regions on a POSTSCRIPT device not supporting "setvariabledatabox"; save graphical state; translate, rotate & clip rectangle; issue FILEMAKER PRO prolog; select and issue correct page section; issue FILEMAKER PRO trailer section; restore graphical state; issue the modified "copypage" command to render the required pages and restore the rectangular bitmap portion(s) and restart the procedure.

If the last page according to the VDFx.PS file must be printed, the modified "copypage" is substituted by a modified "showpage" command, that issues as much identical copies as is required by the variable data merger application program operator, but the contents of the bitmap memory is lost by this operation. The contents of the bitmap memory means is reset to represent a "blank page", ready to accept the data for the next page. The modified "showpage" command has another AGFASCRIPT specific side-effect. Once all required copies are printed, all rectangular portions—saved in cache memory means by the "setvariabledatabox"-command—are erased from the cache memory means. As such, these portions are made inaccessible, even for subsequent AGFASCRIPT specific "copypage" or "showpage" commands to come.

After the last modified "showpage" command, the full context, which was stored by the "_AGFA_SAVE_CONTEXT" command, is now restored by the "_AGFA_RESTORE_CONTEXT" command. And finally the trailer section from the MASTER.PS file—output from PAGEMAKER—is issued in the output data stream. This trailer section starts at the DSC "%%Trailer"-comment and ends at the last character of the MASTER.PS file.

The above description is confined to a one sheet background image and one page specific image region within the background image. The master file may however contain more pages. In that case, preferentially first all sheets corresponding to the first page section in the MASTER.PS file are printed; thereafter, all sheets corresponding to the second page section in the MASTER.PS file are printed etc. To accomplish this, the step where the trailer section of the MASTER.PS file is introduced in the output data stream, is postponed and replaced by an iteration that restarts at the output of the page section of the MASTER.PS file—Page 2 only. The other steps follow the same sequence as for page 1 in the MASTER.PS-file. As usual, the page section starts with the DSC "%%Page"-comment and ends where the next "%%Page"-comment appears, or the final "%%Trailer"-comment, which terminates the last page section. As long as the "%%Trailer"-comment is not met, the process iterates for handling a next page section of the MASTER.PS file. Once the trailer section is encountered, the current page section of the MASTER.PS file is processed, by inclusion of the expanded VDFx.PS-file(s), and the output data stream is concluded by the trailer section of the MASTER.PS file.

It is also possible that a page section of the MASTER.PS file refers to more than one VDFx.PS file, say VDFx.PS and VDFy.PS. In that case the AGFA_SAVE_VDF_BOX will be invoked for two bitmap portions, each enclosing one of both page specific image regions. The issuance of the modified "copypage" or "showpage" command is postponed to happen after a new iteration of translation and rotation, prolog section of the VDFy.PS file, page section of the current page in the VDFy.PS file and trailer section of the VDFy.PS file. If yet a third VDFx.PS file was referred to in the current page of the MASTER.PS file, then again the process iterates from the translation and rotation. After the "current page" of each referenced VDFx.PS file is included, along with the corresponding prolog and trailer section, a modified "copypage" command—or for the last page section in VDFx.PS-file a modified "showpage" command—is issued, and then the next page section or the final trailer section of the MASTER.PS file is handled.

If more than one page specific image region is present in a background image region, it is possible that two or more of these image regions have overlapping portions. In that case, it is important to decide which page specific image region must be visible over the other for the common portion. This overlap sequence must be transmitted to the variable data merger. That sequence will impose the order in which each current page of the plurality of VDFx.PS files will be included in the data stream. A VDFx.PS file, describing a page specific image region which is covered by a page specific region described by a VDFy.PS, will appear in the output data stream for each page before the VDFY.PS file data.

Another important advantage of the method according to the current invention is the independence of the VDFx.PS files from imposition. Several background images can be prepared, e.g. by the PAGEMAKER application program, resulting in an output file MASTER.PS. An imposition program re-arranges the page sections of the output file MASTER.PS and includes translations and orthogonal rotations required to position correctly one or more background images on a sheet, such that one or more sheets can be folded and constitute a logical sequence of the different pages. When creating the MASTER.PS file, the page specific image regions can be correctly located within the background image. According to the OPI recommendations, the location and orientation of these page specific image regions is encoded in the MASTER.PS file. This file refers to various dummy image files, which must be finally substituted by the page specific data. The file can be offered to an imposition application program, that transforms the MASTER.PS file to e.g. as MASTERI.PS file. The OPI-comments that describe the positional parameters of the dummy image files to be included, have been changed by the imposition program according to the new location and orientation of the background image. The most important advantage to incorporate page specific image regions in the background layout as dummy images, is the fact that they are referenced by the OPI comments, via their filename plus extension and that the positional parameters within the background image are also indicated by the OPI comments. The variable data merger can easily retrieve the spots where the variable data must be introduced, and the positional parameters are taken care of by OPI compliant applications such as most imposition programs. This way, different applications such as a professional page layout application and a database application can be merged, without the need to integrate or completely rewrite them. The variable data merger program can now operate in the same way on the MASTERI.PS file as it worked for the MASTER.PS file. Every VDFx.PS file, which is necessary to obtain the final result, does not need to have knowledge about the imposition that has been performed. This also alleviates the burden on the imposition program. This has to process only the data within the MASTER.PS file describing the background image(s), and no page specific data at all, which can be a substantial amount of data if a lot of records in the database are concerned.

Having described in detail a preferred embodiments of the current invention, it will now be apparent to those skilled in the art that numerous modifications can be made therein without departing from the scope of the invention as defined in the following claims.

21. Workstation
22. Hard disk
23. Raster Image Processor
24. Marking engine
25. Printed sheets
26. Hard disk
27. Ethernet connection
30. Digital image source file generation program
31. Digital image source file
32. Dummy file TIFF1.VDF for first page specific image region
33. Dummy file TIFF2.VDF for second page specific image region
34. Page layout program
35. Output data stream from page layout program
36. Database file
37. Database application program
38. First page specific data file
39. Second page specific data file
40. Variable data field application program
41. Combined data stream
42. First page specific image region
43. Second page specific image region

We claim:

1. A method for printing a plurality of pages, having an identical background image region and at least one page specific image region, comprising the following steps:
   a) generating a complete bitmap representation for said background image region and storing said complete bitmap representation in a bitmap memory device;
   b) extracting at least one portion of said complete bitmap representation and storing said least one portion in a cache memory device;
   c) generating a page specific bitmap representation for said at least one page specific image region and storing said page specific bitmap representation in said bitmap memory device in place of said at least one portion;
   d) outputting the contents of said bitmap memory device to a marking engine for printing at least one page;
   e) restoring said at least one portion from said cache memory device to said bitmap memory device; and,
   f) repeating steps c) to e) until said plurality of pages is printed.

2. The method according to claim 1, wherein said at least one page specific image region has a rectangular shape.

3. The method according to claim 2, wherein said rectangular shape includes two substantially horizontal sides and two substantially vertical sides.

4. The method according to claim 2, wherein said background region is rectangular with four sides and wherein said rectangular shape is rotated with respect to said background image region such that none of the sides of said rectangular shape are parallel with any of said four sides of the background image region.

5. The method according to claim 1, wherein each said page specific bitmap representation completely covers at least one said portion.

6. The method according to claim 1, wherein in each iteration a page specific bitmap representation is generated for each page specific image region, and each extracted portion of said complete bitmap representation is restored.

7. The method according to claim 1, wherein for some iterations at least one page specific bitmap representation is repeated such that at least one extracted portion of said complete bitmap representation is not restored.

8. A method for printing a plurality of pages, having an identical background image region and at least one page specific image region, comprising the following steps:
   a) generating a background data stream for providing:
      1) a complete description of said background image region; and
      2) at least one positional parameter for locating said at least one page specific image region with respect to said background image region;
   a) writing said complete description of said background image region to a first bitmap memory device;
   b) generating a page specific data stream for providing a description of said at least one page specific image region for each of said plurality of pages;
   c) extracting at least one portion of said complete description of said background image region from said first bitmap memory device, and saving said at least one portion in a second bitmap memory device; and,
   d) printing said plurality of pages by repeatedly inserting said description of said at least one page specific image region provided by said data stream into said first bitmap memory device in place of said at least one portion and outputting the contents of said first bitmap to a marking engine.

9. The method according to claim 8, wherein said at least one positional parameter includes:
   a) a location relative to said background image;
   b) a shape;
   c) a size; and
   d) an orientation.

10. The method according to claim 9, wherein said at least one positional parameter further includes a reference to said description of said at least one page specific image region.

11. The method according to claim 10, wherein the step of generating a page specific data stream comprises the step of retrieving said reference to said description of said at least one page specific image region from said background data stream.

12. The method according to claim 8, wherein the step of writing said complete description of said background image region to a first bitmap memory device is preceded by a step of performing any transformation on said background data stream required for imposition.

13. The method according to claim 8, wherein the step of extracting at least one portion of said complete description of said background image comprises the step of extracting the at least one portion according to said page specific data stream, and said at least one positional parameter.

14. The method according to claim 8, wherein the step of generating a page specific data stream comprises the step of ordering the processing of each page specific image region.

15. A method according to claim 8 wherein for each iteration, at least one portion of said complete description of said background image region is restored from second bitmap memory device to said first bitmap memory device.

16. A method for printing a plurality of pages, having an identical background image region and a page specific image region, comprising the following steps:
 a) generating a background bitmap representation for said background image region and storing said background bitmap representation in a first bitmap memory device;
 b) extracting a portion of said background bitmap representation from said first bitmap memory device, said portion substantially corresponding to a size and a location of said page specific image region, and storing said portion in a cache memory device;
 c) generating a page specific bitmap representation for said page specific image region and inserting said page specific bitmap representation into said first memory device in place of said portion extracted from said background bitmap representation such that said first memory device includes a bitmap representation of one of said plurality of pages;
 d) outputting the contents of said first bitmap memory device to a marking engine for printing at least one copy of one of said plurality of pages;
 e) repeating steps c) and d) until said plurality of pages is printed; and,
 f) restoring said portion of said background bitmap representation from said cache memory device to said bitmap memory device.

17. A method for printing a plurality of pages, having an identical background image region and at least one page specific image region comprising the following steps:
 a) composing a master file in a page description language on a workstation, said master file giving a full description of the identical background image region and positional parameters for locating said at least one page specific region;
 b) loading said master file into a first bitmap memory device;
 c) generating at least one page specific data file for each of the plurality of pages, said page specific data file giving a description of a page specific image formatted in a page description language;
 d) interpreting said master file to determine said positional parameters;
 e) extracting at least one portion of said master file according to said positional parameters and transmitting said at least one portion of said master file to a cache memory device;
 f) painting said at least one page specific data file onto said first bitmap memory device in accordance with said positional parameters;
 g) printing the content of said bitmap memory device;
 h) restoring said at least one portion of said master file from said cache memory device to said first bitmap memory device; and
 i) repeating steps c) through h) until said plurality of pages is printed.

18. The method according to claim 17 wherein said page specific region is rectangular and wherein said positional parameters comprise the location of two diagonally opposed corners of the page specific region.

19. The method of claim 17 wherein said at least one page specific region comprises a plurality of page specific regions and wherein each of said plurality of page specific regions receives a different page specific data file for each of said plurality of pages.

20. The method of claim 17 wherein said at least one page specific region comprises a plurality of page specific regions and wherein at least one of said page specific regions is printed on more than one of the plurality of pages.

21. An apparatus for processing a plurality of pages each including an identical background image region and at least one page specific image region, comprising:
 a) a first bitmap memory device for storing a bitmap corresponding to a page image;
 b) a second bitmap memory device for storing at least one portion of said page image extracted from said first bitmap memory device;
 c) a processor for receiving a data stream describing a plurality of said page images to be printed, said data stream comprising a first data file for describing an identical background image for each of the plurality of pages and at least one second data file for describing at least one page specific image for each of the plurality of pages; and,
 d) wherein said processor loads said first data file into said first bitmap memory device, extracts a portion of said first data file from said first memory device and stores said portion in said second memory device.

22. The apparatus according to claim 21 wherein said processor loads said second data file into said first memory device in place of said portion to form a page image stored in said first bitmap memory device.

23. The apparatus according to claim 22 wherein said processor restores said portion to said first memory device after downloading the contents of said first bitmap memory device to another device connected thereto.

24. The apparatus according to claim 21 wherein said first bitmap memory device and said second bitmap memory device comprise separate addressable sectors of a single memory device.

25. An apparatus for printing a plurality of pages, having an identical background image region and at least one page specific image region, comprising:
 a) a raster image processor for generating a background bitmap representation for said background image region and at least one page specific bitmap representation of said page specific image region for each of said plurality of pages;
 b) a first bitmap memory device for storing said background bitmap representation;

c) a second bitmap memory device for storing at least one portion of said background bitmap representation extracted from said first bitmap memory device; and, d) wherein said raster image processor loads said background bitmap representation into said first bitmap memory device, extracts at least one portion of said background bitmap representation from said first bitmap memory device, stores the at least one extracted portion in said second bitmap memory device and replaces the at least one extracted portion with at least one page specific bitmap representation thereby generating a bit map representative of one of said plurality of pages.

26. An apparatus according to claim 25 further comprising a marking engine in communication with said raster image processor for printing at least one copy of said bitmap representation of one of said plurality of pages.

27. An apparatus according to claim 26 further comprising a workstation in communication with said raster image processor for generating image files corresponding to said background image region and said page specific image region.

28. An apparatus according to claim 25 further comprising a workstation in communication with said raster image processor for generating image files corresponding to said background image region and said page specific image region.

29. An apparatus according to claim 25 wherein said image files are provided in a page description language.

* * * * *